G. G. LOBDELL.
CAST METAL CAR WHEEL.
No. 34,972. Patented Apr. 15, 1862.
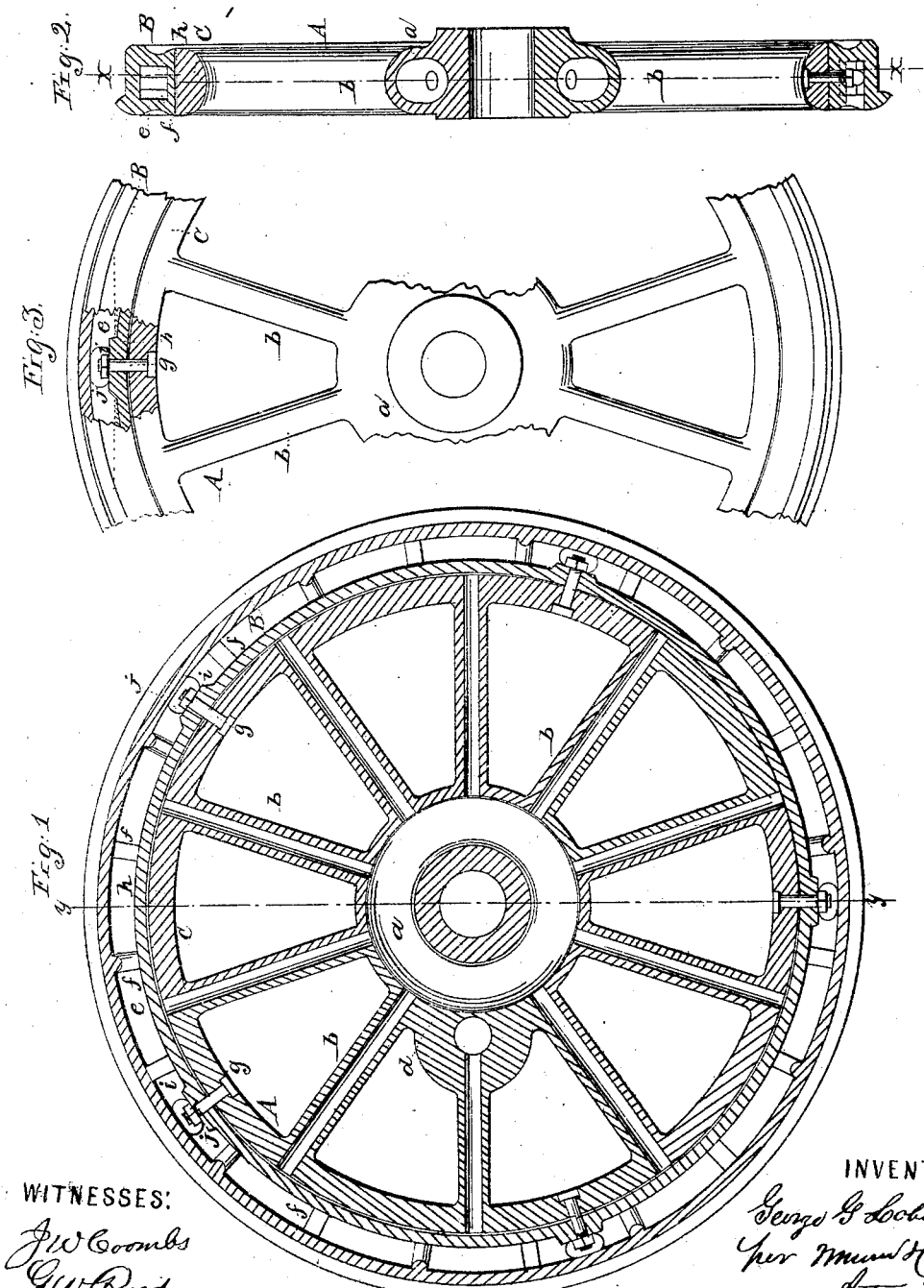
WITNESSES:
J. W. Coombs
G. W. Reed
INVENTOR:
George G. Lobdell
per Munn & Co.
Attorneys

UNITED STATES PATENT OFFICE.

GEORGE G. LOBDELL, OF WILMINGTON, DELAWARE.

IMPROVEMENT IN CAST-METAL CAR-WHEELS.

Specification forming part of Letters Patent No. 34,972, dated April 15, 1862.

*To all whom it may concern:*

Be it known that I, GEORGE G. LOBDELL, of Wilmington, in the county of New Castle and State of Delaware, have invented certain new and useful Improvements in Cast-Metal Car-Wheels provided with Hollow Chilled Tires or Rims; and I do hereby declare that the following is a full, clear, and exact description of the same, reference being had to the accompanying drawings, making a part of this specification, in which—

Figure 1 is a sectional face view of my invention, taken in the line $x\,x$, Fig. 2; Fig. 2, a section of the same, taken in the line $y\,y$, Fig. 1; Fig. 3, a face view of a portion of the same, partially bisected.

Similar letters of reference indicate corresponding parts in the several figures.

The invention consists in a novel and improved manner of securing the hollow tire or rim to the body of the wheel, as hereinafter described, whereby the work aforesaid may be readily performed and in a very secure manner.

The invention also consists in combining with the hollow chilled tire or rim a cast-metal wheel having a hollow hub and arms, whereby great strength with lightness or a moderate weight of metal is obtained.

The invention further consists in a novel way of counterbalancing the wheel when applied or used with the hollow chilled tire or rim aforesaid.

To enable those skilled in the art to fully understand and construct my invention, I will proceed to describe it.

A represents the body of the wheel, which may be of the usual form. This wheel is of cast metal and has a hollow hub $a$ and hollow arms $b$. The rim $c$, however, is solid, with the exception that the bore of the arms $b$ extend through the rim, as shown clearly in Fig. 1. The periphery of the rim $c$ is perfectly smooth, and when the invention is applied to driving-wheels of locomotives a projection $d$ is cast with the wheel A to receive the shackle-pin.

B represents the hollow tire or rim, which is smooth at its inner side and of such diameter that the rim $c$ of the wheel A may fit snugly within it. The interior or chamber $e$ of the tire or rim B is of rectangular form in its transverse section and is provided with radial braces $f$ at equal distances apart. These braces $f$ are of cylindrical form, and they are less in diameter than the width of the chamber $e$, as shown clearly in Fig. 2, so as to leave a space all around them.

The hollow tire or rim B is secured to the wheel A by bolts $g$, which pass through the rim $c$ of the wheel A and have their heads fitted in holes in the inner side of said rim. These bolts $g$ pass through the inner periphery $h$ of the tire B and have nuts $i$ fitted on them, said nuts being screwed up by a wrench which passes through holes $j$ in the side of the tire, a hole $j$ being opposite each nut $i$.

The tire or rim B is cast with a chill, so that it may have a requisite degree of hardness.

The braces $f$ serve as sufficient supports for the tread of the wheel and prevent it from crushing, while at the same time they are perfectly free from the sides of the tire or rim and do not at all interfere with its being readily cast, nor affect the proper chilling of the same.

In order to counterbalance the wheel, lead or any suitable heavy metal or composition (shown in red, Fig. 3) fusible at a low temperature may be poured into the hollow tire B at any desired point. This metal in cooling will shrink tightly around the braces $f$ and be permanently secured in position.

By having the wheel A cast hollow, both arms and hub, and using the same in connection with a hollow tire or rim B, a very light, strong, and durable wheel is obtained, and one applicable for either the "drivers" of locomotives or for ordinary car-wheels.

I do not claim, broadly, a hollow cast-metal tire or rim for car-wheels having braces within it, for they have been previously used; but I do claim as new and desire to secure by Letters Patent—

1. Securing the tire or rim B to the rim $c$ of the wheel A by means of the bolts $g$, passing through the rim $c$ and the inner periphery of the tire or rim B, and having holes $j$ made in the sides of the tire or rim B to turn the nuts $i$, as herein set forth.

2. Counterbalancing the wheel by pouring melted lead or other suitable metal into the chamber $e$ when said metal counterbalance is used or employed with the braces $f$, arranged as set forth.

3. The combination of the hollow wheel A and the hollow tire B, when both are constructed, arranged, and secured together as and for the purpose herein set forth.

GEORGE G. LOBDELL.

Witnesses:
P. N. BRENNAN,
JAS. P. GILLINGHAM.